United States Patent

Shai et al.

[11] Patent Number: 5,877,854
[45] Date of Patent: Mar. 2, 1999

[54] AZIMUTH ALIGNMENT SYSTEM

[75] Inventors: Nahum Shai, Oranit; Avner Korman, Tel Aviv, both of Israel

[73] Assignee: International Technologies (Lasers) Ltd., Rishon Lezion, Israel

[21] Appl. No.: 16,393

[22] Filed: Feb. 2, 1998

[51] Int. Cl.[6] .................................................. G01B 11/26
[52] U.S. Cl. ...................................... 356/138; 356/141.1
[58] Field of Search .................................... 356/399–401, 356/138, 375, 139.01–139.08, 139.1, 140, 141.1–141.5, 147, 150–151, 152.1–152.3, 153–154, 4.01–5.15; 33/DIG. 21, 276, 281, 282, 283, 284, 285, 286, 293, 304; 250/203.1–203.7, 206, 206.1–206.3

[56] References Cited

U.S. PATENT DOCUMENTS

5,098,185 3/1992 Watanabe et al. .
5,392,521 2/1995 Allen .
5,541,726 7/1996 Nakajima .

*Primary Examiner*—K. P. Hantis
*Attorney, Agent, or Firm*—Mark M. Friedman

[57] ABSTRACT

An azimuth alignment system for an underground azimuth alignable device, the azimuth alignment system including (a) an underground unit including two spaced linear light sensitive articles on an upper face thereof, each of the light sensitive articles including a row of miniature light sensitive elements, the underground unit being connectable in a known positional relation to the underground azimuth alignable device; and (b) an aboveground azimuth alignable telescope device having a longitudinal axis, the telescope device including an aboveground unit, the aboveground unit including at least one light source for generating at least one light beam being detectable by the miniature light sensitive elements of the light sensitive articles, each of the light sources being positioned in a known relation with respect to the longitudinal axis of the telescope device, such that by aligning the telescope device in a desired azimuth and illuminating the light sensitive articles of the underground unit, a deviation of the underground unit and therefore of the underground azimuth alignable device from the desired azimuth is calculable and therefore correctable.

24 Claims, 6 Drawing Sheets

Fig. 9 alpha = arctan(Pf-Pb)/S

Fig. 10 alpha = arctan(8/120)=3.8 °

Fig. 11

AZIMUTH ALIGNMENT SYSTEM

FIELD AND BACKGROUND OF THE INVENTION

The present invention relates to azimuth alignment and, more particularly, to an azimuth alignment system for azimuth alignment of other systems, e.g., an azimuth alignable laser system.

Laser systems are frequently used by constructors for vertical and horizontal alignments. In most applications the two locations to be aligned form a direct line-of-sight therebetween. However, this is not the case in underground digging applications, such as when underground tunnels for laying gravitational flow pipes are dug.

The DIALGRADE system is a laser system manufactured by Spectra Physics Laserplane Inc. This specific system includes a collimated red laser, 635 nm, a two dimensional laser beam deflector, and an auto-leveling module. The device provides a visible laser beam directable in a desired orientation. Elevation is set to a required grade in reference to the gravitation level, while the azimuth is aligned with a line-of-sight dictated by the operator. The beam is used as a guiding beam for laying gravitational flow pipes.

Generally, this laser system is set at a course direction pointing towards a remote reference point, then fine alignment (in the range of ±3°) is effected electronically by the deflector module.

Usually the system is positioned below ground surface (up to 9 m) where no direct line-of-sight to the remote reference point is available.

For fine azimuth alignment a special procedure is used in order to provide a direct reference point to the operator. In general, fine alignment is achieved at ground level, thereafter the system is carefully lowered underground with the aim of keeping the surface alignment while lowering the system. Low accuracy is the disadvantage of this procedure.

There is thus a recognized need for, and it would be highly advantageous to have an azimuth alignment system for alignment of an azimuth alignable laser system, especially in cases where a direct line-of-sight between the azimuth alignable laser system and a reference point is not applicable.

SUMMARY OF THE INVENTION

According to the present invention there is provided an azimuth alignment system for azimuth alignment of other systems, e.g., an azimuth alignable laser system.

According to further features in preferred embodiments of the invention described below, provided is an azimuth alignment system for an underground azimuth alignable device, the azimuth alignment system comprising (a) an underground unit including two spaced linear light sensitive articles on an upper face thereof, each of the light sensitive articles including a row of miniature light sensitive elements, the underground unit being connectable in a known positional relation to the underground azimuth alignable device; and (b) an aboveground azimuth alignable telescope device having a longitudinal axis, the telescope device including an aboveground unit, the aboveground unit including at least one light source for generating at least one light beam being detectable by the miniature light sensitive elements of the light sensitive articles, each of the light sources being positioned in a known relation with respect to the longitudinal axis of the telescope device, such that by aligning the telescope device in a desired azimuth and illuminating the light sensitive articles of the underground unit, a deviation of the underground unit and therefore of the underground azimuth alignable device from the desired azimuth is calculable and therefore correctable.

According to further features in preferred embodiments of the invention described below, provided is an azimuth alignable laser system comprising (a) an underground laser system for generating a visible laser beam; (b) an underground unit including two spaced linear light sensitive articles on an upper face thereof, each of the light sensitive articles including a row of miniature light sensitive elements, the underground unit being connected in a known positional relation to the laser system; and (c) an aboveground azimuth alignable telescope device having a longitudinal axis, the telescope device including an aboveground unit, the aboveground unit including at least one light source for generating at least one light beam being detectable by the miniature light sensitive elements of the light sensitive articles, each of the light sources being positioned in a known relation with respect to the longitudinal axis of the telescope device, such that by aligning the telescope device in a desired azimuth and illuminating the light sensitive articles of the underground unit, a deviation of the underground unit and therefore of the laser system from the desired azimuth is calculable and therefore correctable.

According to further features in preferred embodiments of the invention described below, provided is a method of azimuth alignment of an underground azimuth alignable device, the method comprising the steps of (a) attaching to the underground azimuth alignable device in a known positional relation an underground unit including two spaced linear light sensitive articles on an upper face thereof, each of the light sensitive articles including a row of miniature light sensitive elements; (b) providing an aboveground azimuth alignable telescope device having a longitudinal axis, the telescope device including an aboveground unit, the aboveground unit including at least one light source for generating at least one light beam being detectable by the miniature light sensitive elements of the light sensitive articles, each of the light sources being positioned in a known relation with respect to the longitudinal axis of the telescope device; (c) aligning the telescope device in a desired azimuth; (d) illuminating the light sensitive articles of the underground unit via the light source(s); (e) calculating a deviation of the underground unit and therefore of the underground azimuth alignable device from the desired azimuth; and (f) correcting the deviation.

According to still further features in the described preferred embodiments each of the light sensitive articles is a linear CCD (charge coupled device) sensor and each of the light sensitive elements is a CCD pixel.

According to still further features in the described preferred embodiments each of the light sources includes a laser generator.

According to still further features in the described preferred embodiments the aboveground unit includes a single light source generating a linear line profile beam which is in a known relation with respect to the longitudinal axis of the telescope device, the linear line profile beam is designed to cross both the light sensitive articles.

According to still further features in the described preferred embodiments the aboveground unit includes two light sources each generating a linear line profile beam which is in a known relation with respect to the longitudinal axis of the telescope device, each of the linear line profile beams is designed to cross one of the light sensitive articles.

According to still further features in the described preferred embodiments the aboveground unit includes two light sources each is translatable along a line which is in a known relation with respect to the longitudinal axis of the telescope device.

According to still further features in the described preferred embodiments the known relation with respect to the longitudinal axis of the telescope device is being perpendicular.

According to still further features in the described preferred embodiments the known positional relation is co-alignment, such that when the underground unit is connected to the underground azimuth alignable device, each of the light sensitive articles is perpendicular to a longitudinal axis of the underground azimuth alignable device.

According to still further features in the described preferred embodiments the underground azimuth alignable device is a laser system for providing a visible laser beam.

According to still further features in the described preferred embodiments an orientation of the laser beam is electronically controlled.

According to still further features in the described preferred embodiments the underground unit electronically communicates with the laser system for orienting the laser beam in the desired azimuth.

According to still further features in the described preferred embodiments the telescope device is selected from the group consisting of a sight device, an optical telescope and a laser telescope.

The present invention successfully addresses the shortcomings of the presently known configurations by providing a system for azimuth alignment in conditions where a direct line-of-site is not applicable.

BRIEF DESCRIPTION OF THE DRAWINGS

The invention herein described, by way of example only, with reference to the accompanying drawings, wherein.

DESCRIPTION OF THE PREFERRED EMBODIMENTS

The present invention is of an azimuth alignment system which can be used for azimuth alignment of other systems. Specifically, the present invention can be used to for azimuth alignment of an azimuth alignable laser system, especially in cases where a direct line-of-sight between the azimuth alignable laser system and a reference point is not applicable.

The principles and operation of a system according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
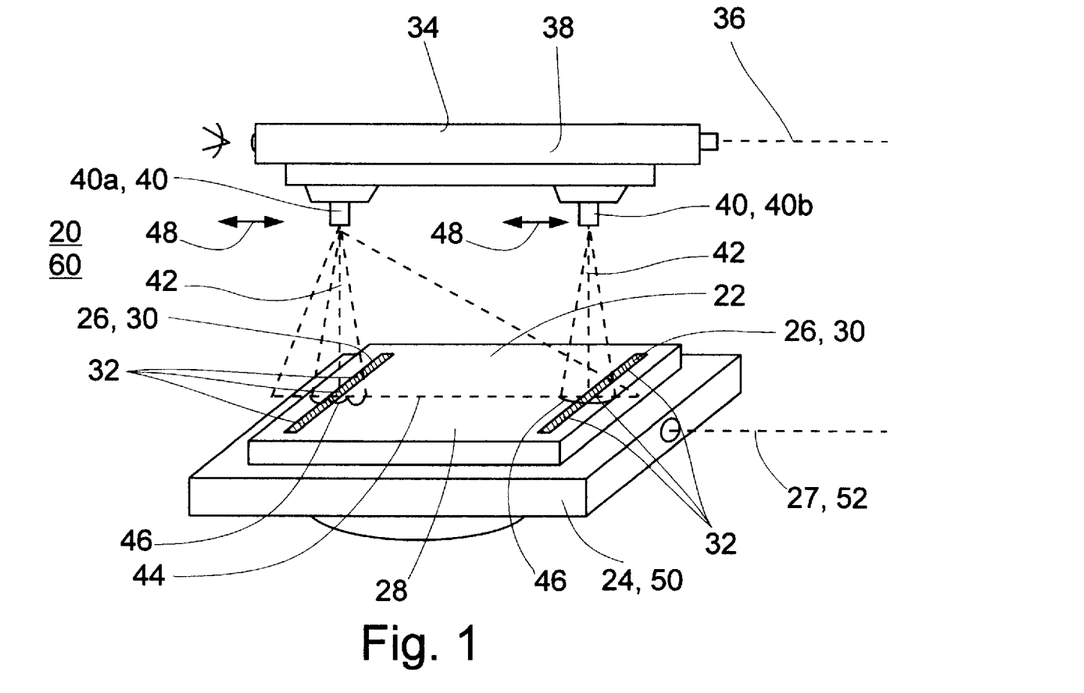
FIG. 1 is a simplified perspective view of the azimuth alignment system and of an azimuth alignable laser system according to the present invention.

Referring now to the drawings, FIG. I illustrates the azimuth alignment system according to the present invention which is referred to hereinbelow as system 20.

Azimuth alignment system 20 includes an underground unit 22 connectable in a known positional relation (e.g., co-alignment) to an underground azimuth alignable device 24.

Unit 22 includes at least two spaced (separated) linear light sensitive articles 26 on an upper face 28 thereof. Each of light sensitive articles 26 includes a row 30 of miniature (e.g., in the micrometer range) light sensitive elements 32.

Each of light sensitive articles 26 is preferably perpendicular to a longitudinal axis 27 of underground azimuth alignable device 24.

Azimuth alignment system 20 further includes an aboveground azimuth alignable telescope device 34 having a longitudinal (e.g., optical) axis 36. Telescope device 34 includes an aboveground unit 38 which includes at least one light source 40 (two are shown), for generating at least one light beam 42 (two are shown) detectable by miniature light sensitive elements 32 of light sensitive articles 26.

Each of light sources 40 is positioned in a known relation (e.g., perpendicular to) with respect to longitudinal axis 36 of telescope device 34, such that by aligning telescope device 34 in a desired azimuth and illuminating light sensitive articles 32 of underground unit 22, a deviation of underground unit 22 and therefore of the underground azimuth alignable device 24 from the desired azimuth is calculable and therefore correctable.

According to a preferred embodiment of the present invention each of light sensitive articles 26 is a linear CCD (charge coupled device) sensor and each of light sensitive elements is a CCD pixel. Suitable linear CCD sensors are distribute, for example, by Sony (Cat. No. ILX 503 or ILX 511 for higher sensitivity).

According to another prefered embodiment of the present invention aboveground unit 38 includes a single light source, say 40a, generating a linear line profile beam 44, which is in a known relation (typically parallels) with respect to longitudinal axis 36 of telescope device 34. Following course alignment, linear line profile beam 44 is designed to cross both light sensitive articles 26 of underground unit 22.

According to still another prefered embodiment of the present invention aboveground unit 38 includes two light sources, say 40a and 40b, each generating a linear line profile beam 46, which is in a known relation with respect to longitudinal axis 36 of telescope device 34. Following course alignment, each of linear line profile beams 46 is designed to cross one of light sensitive articles 26.

According to still another prefered embodiment of the present invention aboveground unit 38 includes two light sources, say 40a and 40b, each is translatable, as indicated by arrows 48, along a line which is in a known relation with respect to longitudinal axis 36 of telescope device 34. In this case the beam profile may be a dot profile.

According to yet another prefered embodiment of the present invention, each of light source(s) 40 includes a laser generator (internal) for generating a laser beam. However, as will be appreciated by one ordinarily skilled in the art, multiband light sources provided with adequate lenses (e.g., cylindrical or asymmetric lens) or other devices (e.g., slit plate) are also applicable.

According to a another prefered embodiment of the present invention underground azimuth alignable device 24 is a laser system 50 for providing a visible laser beam 52.

According to a preferred embodiment the azimuth orientation of laser beam 52 is to a certain degree, say ±3°, and is electronically controlled by device 50 (via suitable deflectors).

According to another preferred embodiment underground unit 22 electronically communicates with laser system 50 for orienting laser beam 52 in the desired azimuth.

According to yet another preferred embodiment, telescope device 34 is a sight device, an optical telescope or a laser telescope. Suitable optical telescopes are distribute by Spectra Physics Laserplane Inc. Suitable laser telescopes are distribute by International Technologies (Lasers) Ltd. (Israel).

Further according to the present invention, and as also shown in FIG. 1, there is provided an azimuth alignable laser system 60 which follows any one of the above preferred embodiments. As will be appreciated by one ordinarily skilled in the art, in this case the underground unit and the laser system are integratable into a single underground device.

Further according to the present invention there is provided a method of azimuth alignment of an underground azimuth alignable device. The method includes the following steps.

First, an underground unit including two spaced linear light sensitive articles on an upper face thereof is attached in a known positional relation to the underground azimuth alignable device. Each of the light sensitive articles includes a row of miniature light sensitive elements.

Second, an aboveground azimuth alignable telescope device is provided. The aboveground azimuth alignable telescope device has a longitudinal axis and includes an aboveground unit which includes at least one light source for generating at least one light beam detectable by the miniature light sensitive elements of the light sensitive articles. Each of the light sources is positioned in a known relation with respect to the longitudinal axis of the telescope device.

Third, the telescope device is aligned in a desired azimuth.

Fourth, the light sensitive articles of the underground unit are illuminated via the light source(s).

Fifth, a deviation of the underground unit and therefore of the underground azimuth alignable device from the desired azimuth is calculated.

Finally, the deviation is corrected.

Reference is now made to the following example, which together with the above descriptions, illustrate the invention in a non limiting fashion.

The system according to the present invention was particularly designed to allow alignment of the DIALGRADE system at reference ranges of 100 m, with angular azimuth accuracy of 0.2 mRad were the DIALGRADE system is between 1 and 10 meters underground within a manhole of, for example, a sewage system.

The system was further designed to provide the operator with a simple procedure for initial setup alignment which falls within the electronic deflection range of ±3° of the DIALGRADE system.

Basically the system according to the present invention includes an optical sight (telescope) mounted on a tripod above the manhole within which the DIALGRADE system is located underground at an initial course alignment.

An optical angular encoder, constituting a laser transmitter and a CCD sensor unit, links between the optical sight and the remote DIALGRADE system. The sensor unit provides output data which (accurately indicates the misalignment angle between the projection of the line-of-sight onto the mechanical reference plane of the DIALGRADE system. This data is utilized to command the azimuth deflector of the DIALGRADE system in order to attain fine alignment.

Encoders usually output data relative to the angle between two physical parts. In the present case one of those parts is attached to a optical sight (telescope) for determining the line-of-sight orientation, whereas the second part is attached to the DIALGRADE system for determining the orientation of the mechanical reference frame of the DIALGRADE system.

The encoder shall provide output proportional to the angle between the projection of the line-of-sight on the horizontal reference plane of the DIALGRADE system.

The parts in this case are not mechanically linked (at any of the six degrees of freedom). Their relative positions and orientation are not known within the following limits: (i) vertical separation may vary between 1 m to 10 m; (ii) lateral offset perpendicular to the line-of-sight in the range of ±0.5 cm; (iii) lateral offset along the line-of-sight in the range of ±2 cm; (iv) azimuth angle misalignment within ±50 mRad; (v) elevation grade misalignment within ±20°; (vi) roll angle of less than 3°.

Due to cost considerations the system of the present invention is limited to electro-optical technology for remotely measuring the angle between the two parts. The available components include laser diodes, PIN (positive intrinsic negative) photodetectors, linear CCD sensors, simple optical components and micro processing components.

A transmitting unit is attached to the optical sight and is emitting two well defined beams having a linear line profile.

Figure 2:
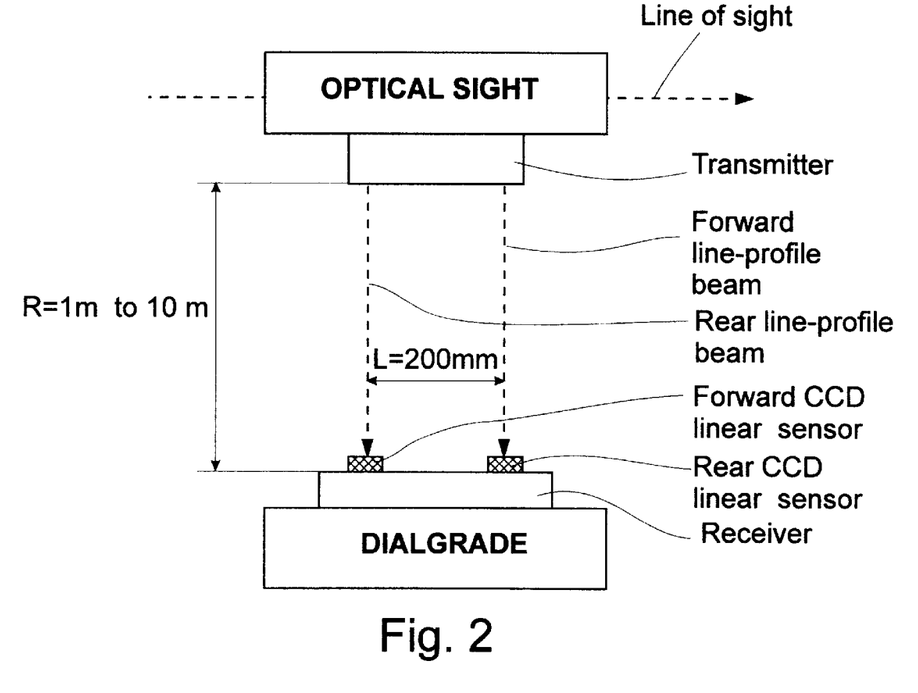
FIG. 2 is a schematic side view illustration of the azimuth alignment system according to the present invention implemented on a DIALGRADE laser system.
Figure 3:
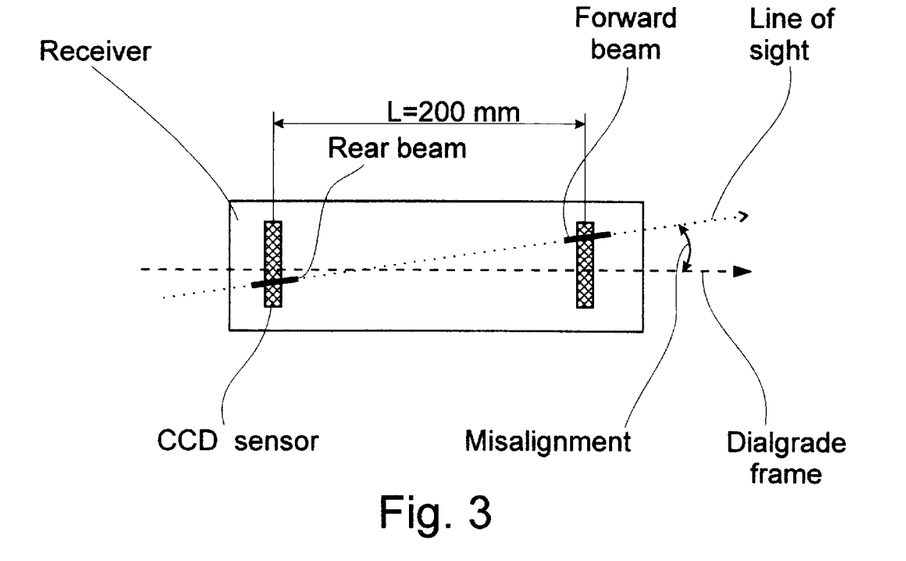
FIG. 3 is a top view of the receiver shown in FIG. 2, demonstrating the operational concept of the system according to the present invention.
Figure 4:
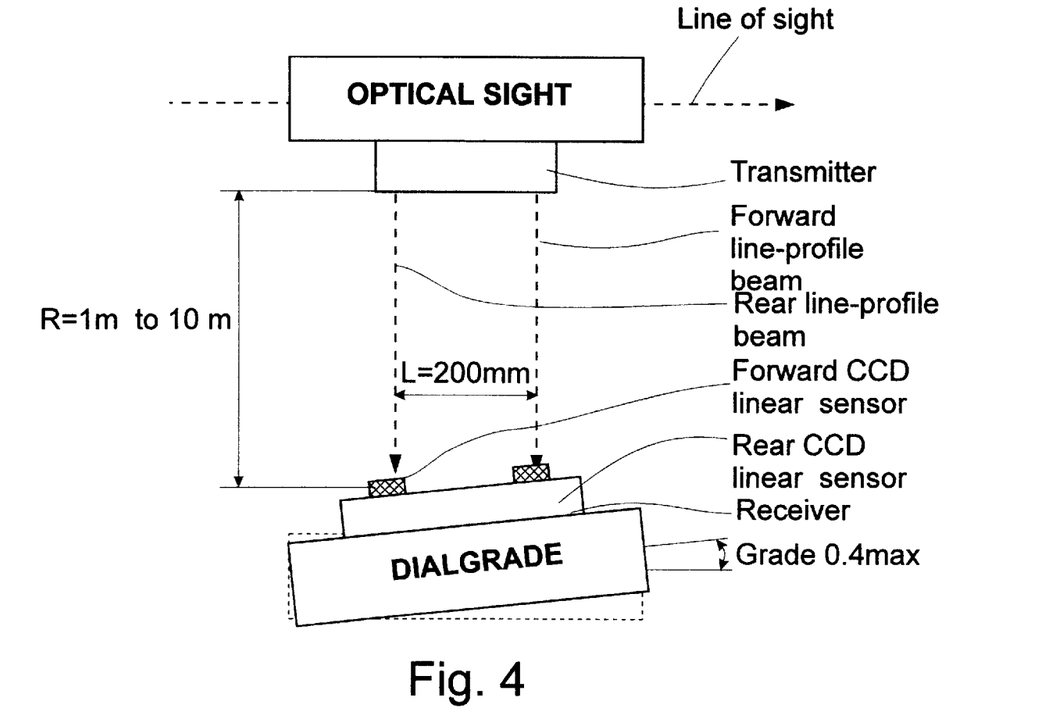
FIG. 4 is a schematic side view illustration of the azimuth alignment system according to the present invention implemented on a DIALGRADE system, the DIALGRADE system is shown in an elevation grade offset.
Figure 5:
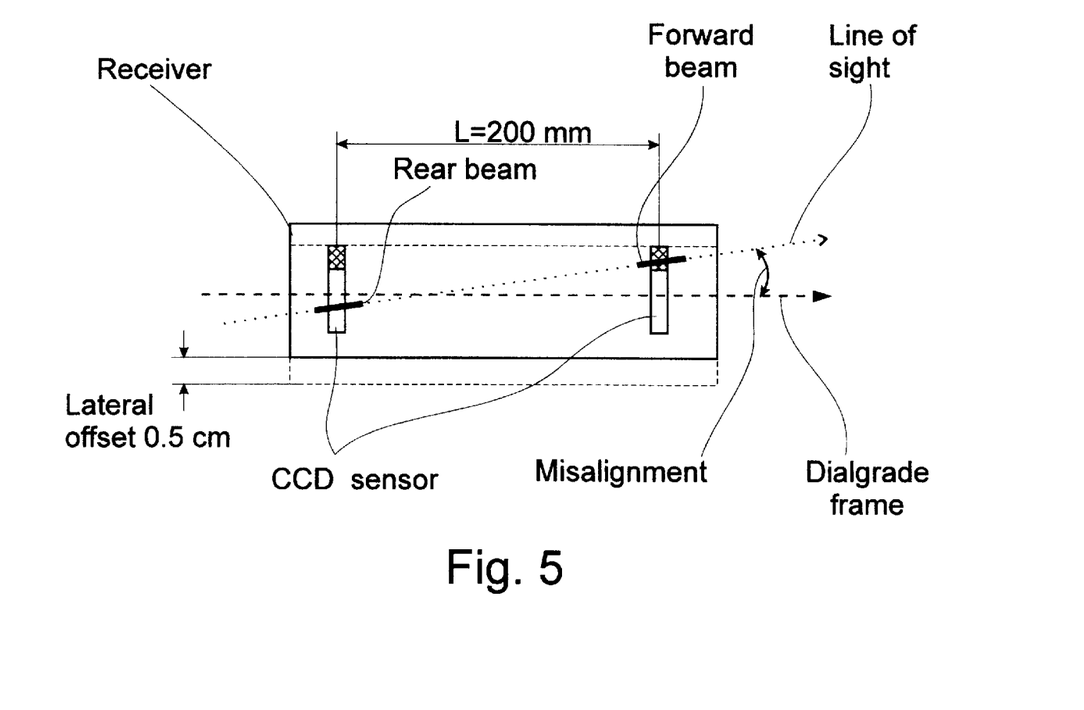
FIG. 5 is a schematic top view of the receiver of FIG. 2, demonstrating the operational concept of the system according to the present invention when the DIALGRADE system is in a lateral offset.
Figure 6:
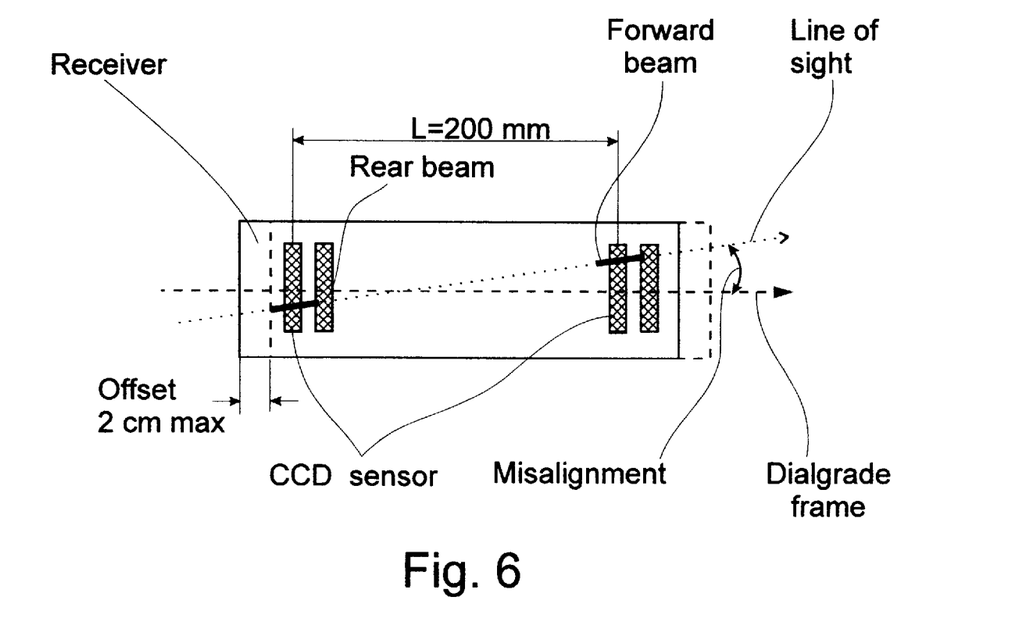
FIG. 6 is a schematic top view of the receiver of FIG. 2, demonstrating the operational concept of the system according to the present invention when the DIALGRADE system is in a forward offset.
Figure 7:
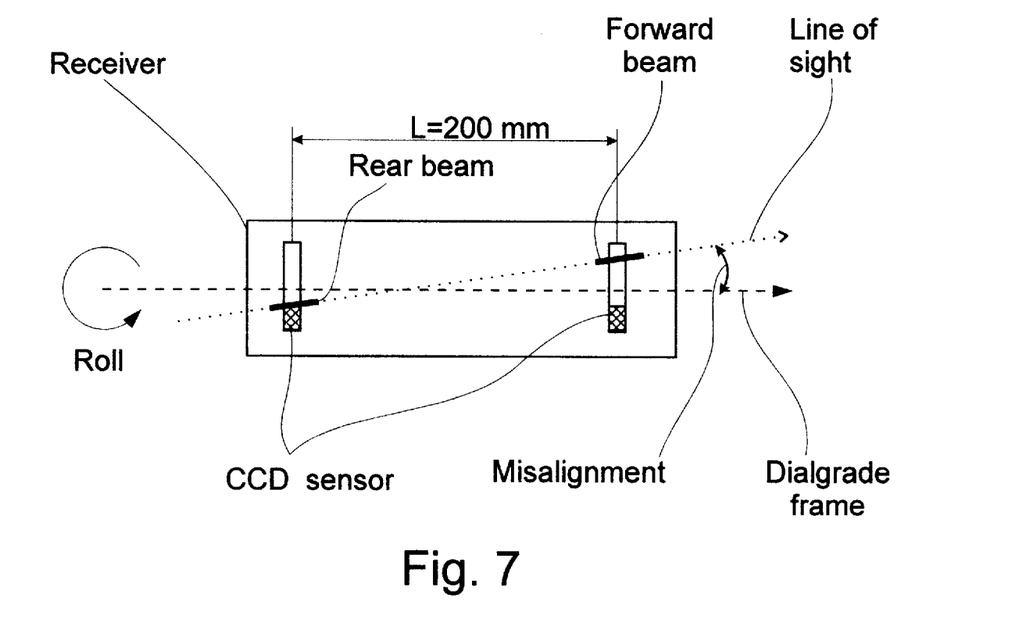
FIG. 7 is a schematic top view of the receiver of FIG. 2, demonstrating the operational concept of the system according to the present invention when the DIALGRADE system is in a roll offset.

The imaginary line passing along these line profiles is in a predetermined alignment in azimuth with the line-of-sight. These beams are directed vertically towards a receiving unit attached to the DIALGRADE system in a predetermined alignment with its mechanical frame. The receiving unit includes two linear CCD sensors where each sensor measures the location of one of the transmitted beams. FIGS. 2–3 provide an illustration of the basic geometry of the system. FIGS. 4–7 provide illustrations of the geometry of the system upon offsets as indicated.

The transmitter unit is mechanically attached to the optical sight. It has a mechanism that enables to roughly level it (within 1°), while maintaining a mechanical connection to follow the azimuth movement of the optical sight. The transmitter emits two collimated laser beams in a vertical orientation towards the receiver unit. Each beam has a linear line profile of a length greater than 60 mm (for covering the Forward/Backward offset of ±20 mm and additional 20 mm for covering the maximal grade offset, resulting in 60 mm). Beam width should be as narrow as possible, practically it is collimated to about 0.2 mRad resulting in 2 mm at 10 m range. As further detailed hereinunder, the beams power is controlled to match the dynamic range of the CCD receiver detectors.

The emitted beam wavelength is 660 nm which matches the sensor's spectral response and is also visible, thus rendering the initial setup easier.

The linear line profile of the beams is implemented by using a precise linear scanning mechanism which is further discussed hereinbelow.

Figure 8:
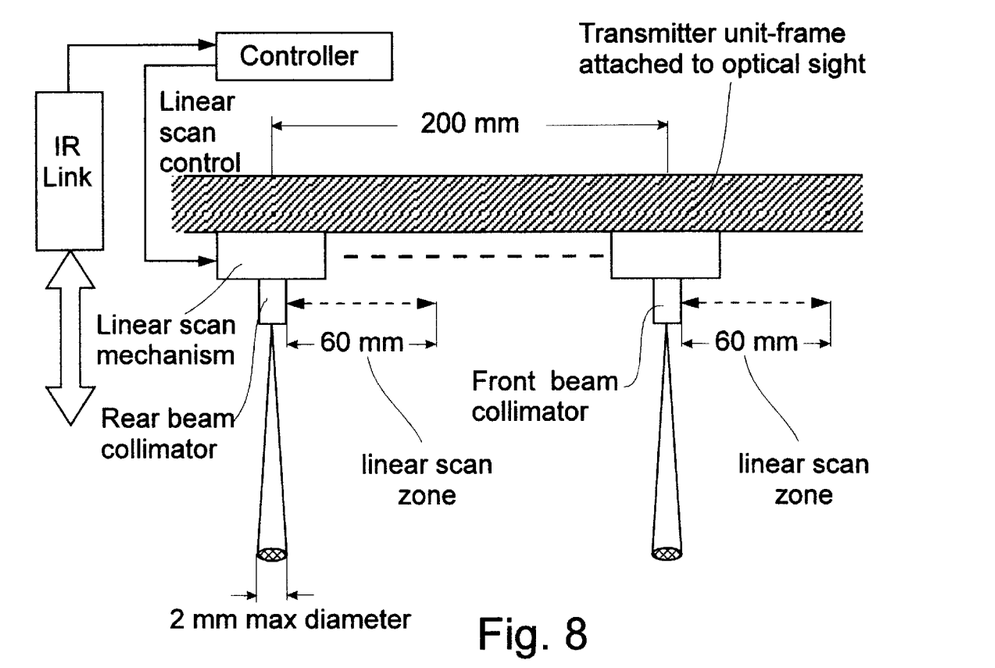
FIG. 8 is a block diagram of the transmitter of the system according to the present invention designed for operation with the DIALGRADE system.

A block diagram of the system according to the present invention is given in FIG. 8.

Figure 9:
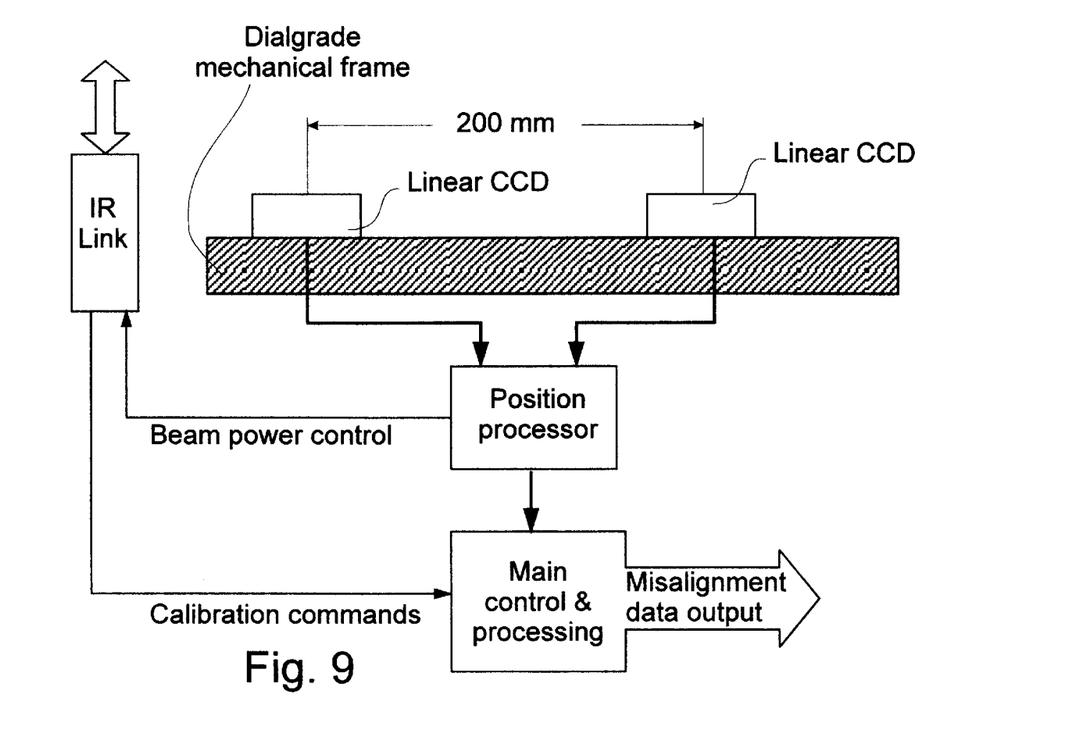
FIG. 9 is a block diagram of the receiver of the system according to the present invention designed for operation with the DIALGRADE system.
Figure 10:
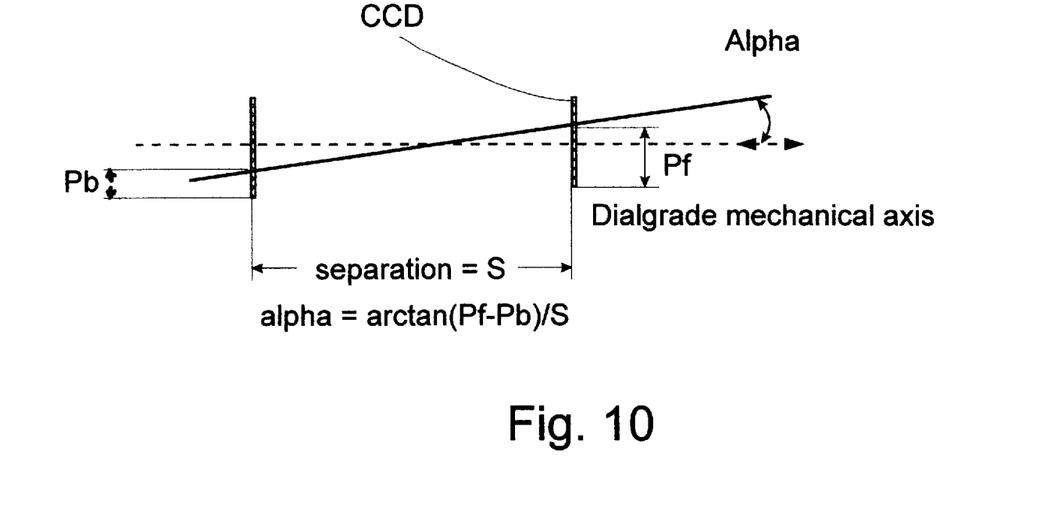
FIG. 10 is a calculation scheme demonstrating how to compute the misalignment rotational using the system according to the present invention.

As shown in the block diagram of FIG. 9, the receiver is mechanically attached to the frame of the DIALGRADE system. It includes two linear CCD sensors mounted perpendicular to the main axis, separated therebetween 200 mm along the main axis. The CCD sensors provide data corresponding to the cross point position of the linear beam and the sensors' scanning axis. Knowing the separation and the two cross position of the beams enable to compute the misalignment rotational angle between the projection of the line-of-sight on the horizontal reference plane of the DIALGRADE system, see FIG. 10.

Each CCD detector includes 2,048 pixels, 14×14 micron pixel size, with an effective length of 28 mm.

Figure 11:
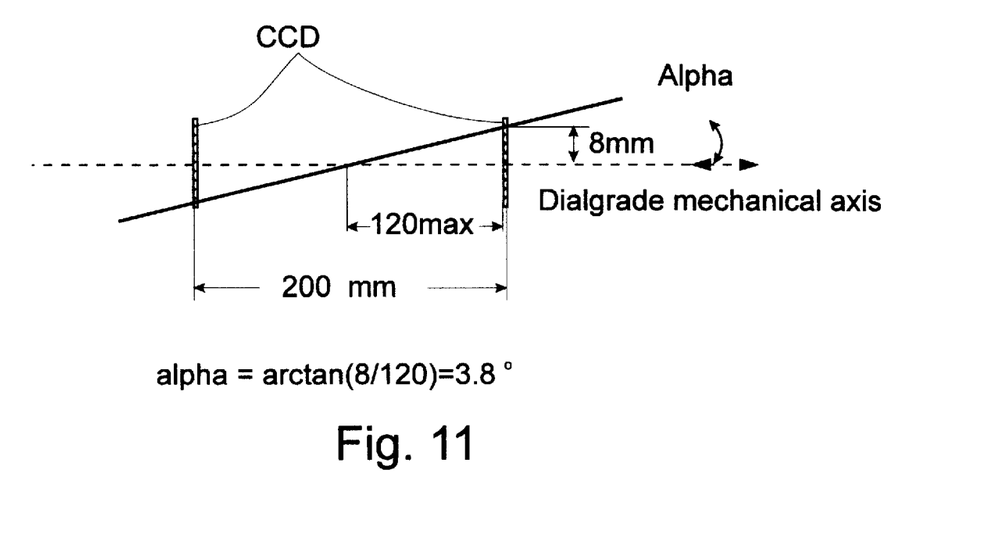
FIG. 11 demonstrates the worst case initial misalignment range of the system according to the present invention.

Beam effective travel length, assuming 2 mm beam-width and 5 mm lateral offset, ensures a 16 mm beam over the CCD overlap range. As shown in FIG. 11, a worst case initial misalignment range of ±3.8° is allowed in this setup (complying with the internal deflection range of the DIALGRADE system).

As further shown in the block diagram of FIG. 9, the video signals of the two CCD sensors are fed to a processor (DSP) which extracts the position of the crossing points. Using the calibration data stored in the memory it computes the misalignment angel constituting the output of the unit. Using an infra-red (IR) link or any other remote communication media, between the transmitter and the receiver, the power of the beams are adjusted in real-time to match the dynamic range of the CCD at the given setup. The IR link is also used during on-site calibration.

The setup procedure includes two phases.

The first phase is calibration-on-site, where both the optical sight and the DIALGRADE system are aligned optically to a single reference point outside the manhole. The receiver unit stores the misalignment as the base calibrated zero.

The DIALGRADE system is mounted on the tripod below the transmitter unit. A DIALGRADE laser spot is aimed to any target at a range greater than 20 m. Than the reticule of the sight is brought to overlap with the laser spot for zero bore sighting.

The second phase includes mounting the DIALGRADE system in the manhole at an initial orientation that ensures overlapping of the beams with the CCD sensors. The roll should be kept within ±3.3° (the roll introduces a calibration error. For 0.2% accuracy the maximum allowable roll is 3.3°).

The positioning of the DIALGRADE system is quit easy since the beams are visible. While positioning the DIALGRADE system the optical sight is aimed to the reference target.

The beam-width is about 2 mm (depending on range) covering about 140 pixels. In order to attain the required resolution of 0.2 mRad the video signal should be processed to compute the beams' centers. By employing correlation techniques, a beam shift relative to a calibration point is computed. The repeatability (short term) is determined by the signal-to-noise ratio free of nonlinear distortions.

The error sources affecting the repeatability of the measured coordinates Pf and Pr (see FIG. 10) are the sensors' dark noise, background illumination, electronic amplifier noise and beam stability. These noise sources may be controlled to some extend by (i) matching the beams' energy to cover all available dynamic range of the CCD without driving it into saturation. This provides an inherent ratio of 600; (ii) using fairly long integration times to narrow the bandwidth; (iii) using optical filters to reduce background radiation, as well as configuration design in order to reduce the field of view of the detectors; (iv) using stable beam sources; and (v) averaging over the beams' cross sections to reduce beam wandering.

Since the mechanical alignment of the DIALGRADE system as referred to the transmitter may vary from setup to setup, the non linearity along the beam length may introduce errors. Obtaining accurate linear collimated beams is too complex and costly. The beams are implemented by using laser pointers such as those manufactured by International Technologies (Lasers) Ltd. (Israel), which are dot collimated sources scanned linearly by a mechanical mechanism which ensures the required linearity of 0.1 mRad. Employing mechanical scanning ensures that the CCD/beam relations are invariant with the lateral positioning of the units. The CCDs will always sample the entire beam thus repeating the exact conditions of the on-site-calibration as long as the system parameters stay stable during the time of installing the DIALGRADE system in the manhole.

The saturation energy density of the CCD sensors is 0.036 lux·sec at 660 nm. For 637 lum/watt the saturation energy is (0.036/637)×14×14=0.011 pJouls. For 10 ms integration time it corresponds to 1.1 pWatt per pixel. Beam power (2 mm diameter) should be about 20 nWatt which is a very low power and leaves margins for spectral filtering of background radiation.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An azimuth alignment system for an underground azimuth alignable device, the azimuth alignment system comprising:

(a) an underground unit including two spaced linear light sensitive articles on an upper face thereof, each of said light sensitive articles including a row of miniature light sensitive elements, said underground unit being connectable in a known positional relation to the underground azimuth alignable device; and (b) an aboveground azimuth alignable telescope device having a longitudinal axis, said telescope device including an aboveground unit, said aboveground unit including at least one light source for generating at least one light beam being detectable by said miniature light sensitive elements of said light sensitive articles, each of said at least one light sources being positioned in a known relation with respect to said longitudinal axis of said telescope device, such that by aligning said telescope device in a desired azimuth and illuminating said light sensitive articles of said underground unit, a deviation of said underground unit and therefore of the underground azimuth alignable device from said desired azimuth is calculable and therefore correctable.

2. The azimuth alignment system of claim 1 wherein each of said light sensitive articles is a linear CCD sensor and each of said light sensitive elements is a CCD pixel.

3. The azimuth alignment system of claim 1, wherein each of said at least one light source includes a laser generator.

4. The azimuth alignment system of claim 1, wherein said aboveground unit includes a single light source generating a linear line profile beam which is in a known relation with respect to said longitudinal axis of said telescope device, said linear line profile beam is designed to cross both said light sensitive articles.

5. The azimuth alignment system of claim 1, wherein said aboveground unit includes two light sources each generating a linear line profile beam which is in a known relation with respect to said longitudinal axis of said telescope device, each of said linear line profile beams is designed to cross one of said light sensitive articles.

6. The azimuth alignment system of claim 1, wherein said aboveground unit includes two light sources each is translatable along a line which is in a known relation with respect to said longitudinal axis of said telescope device.

7. The azimuth alignment system of claim 1, wherein said known relation with respect to said longitudinal axis of said telescope device is being perpendicular.

8. The azimuth alignment system of claim 1, wherein said known positional relation is co-alignment, such that when said underground unit is connected to the underground azimuth alignable device, each of said light sensitive articles is perpendicular to a longitudinal axis of the underground azimuth alignable device.

9. The azimuth alignment system of claim 1, wherein the underground azimuth alignable device is a laser system for providing a visible laser beam.

10. The azimuth alignment system of claim 9, wherein an orientation of said laser beam is electronically controlled.

11. The azimuth alignment system of claim 10, wherein said underground unit electronically communicates with said laser system for orienting said laser beam in said desired azimuth.

12. The azimuth alignment system of claim 1, wherein said telescope device is selected from the group consisting of a sight device, an optical telescope and a laser telescope.

13. An azimuth alignable laser system comprising:

(a) an underground laser system for generating a visible laser beam;

(b) an underground unit including two spaced linear light sensitive articles on an upper face thereof, each of said light sensitive articles including a row of miniature light sensitive elements, said underground unit being connected in a known positional relation to said laser system; and (c) an aboveground azimuth alignable telescope device having a longitudinal axis, said telescope device including an aboveground unit, said aboveground unit including at least one light source for generating, at least one light beam being detectable by said miniature light sensitive elements of said light sensitive articles, each of said at least one light source being positioned in a known relation with respect to said longitudinal axis of said telescope device, such that by aligning said telescope device in a desired azimuth and illuminating said light sensitive articles of said underground unit, a deviation of said underground unit and therefore of said laser system from said desired azimuth is calculable and therefore correctable.

14. The azimuth alignment system of claim 13, wherein each of said light sensitive articles is a linear CCD sensor and each of said light sensitive elements is a CCD pixel.

15. The azimuth alignment system of claim 13, wherein each of said at least one light source includes a laser generator.

16. The azimuth alignment system of claim 13, wherein said aboveground unit includes a single light source generating a linear line profile beam which is in a known relation with respect to said longitudinal axis of said telescope device, said linear line profile beam is designed to cross both said light sensitive articles.

17. The azimuth alignment system of claim 13, wherein said aboveground unit includes two light sources each generating a linear line profile beam which is in a known relation with respect to said longitudinal axis of said telescope device, each of said linear line profile beams is designed to cross one of said light sensitive articles.

18. The azimuth alignment system of claim 13, wherein said aboveground unit includes two light sources each is translatable along a line which is in a known relation with respect to said longitudinal axis of said telescope device.

19. The azimuth alignment system of claim 13, wherein said known relation with respect to said longitudinal axis of said telescope device is being perpendicular.

20. The azimuth alignment system of claim 13, wherein said known positional relation is co-alignment, such that when said underground unit is connected to said laser device, each of said light sensitive articles is perpendicular to a longitudinal axis of the underground azimuth alignable device.

21. The azimuth alignment system of claim 13, wherein an orientation of said visible laser beam is electronically controlled.

22. The azimuth alignment system of claim 21, wherein said underground unit electronically communicates with said laser system for orienting said laser beam in said desired azimuth.

23. The azimuth alignment system of claim 13, wherein said telescope device is selected from the group consisting of, a sight device, an optical telescope and a laser telescope.

24. A method of azimuth alignment of an underground azimuth alignable device, the method comprising the steps of:

(a) attaching to the underground azimuth alignable device in a known positional relation an underground unit including two spaced linear light sensitive articles on an upper face thereof, each of said light sensitive articles including a row of miniature light sensitive elements;

(b) providing an aboveground azimuth alignable telescope device having a longitudinal axis, said telescope device including an aboveground unit, said aboveground unit including at least one light source for generating at least one light beam being detectable by said miniature light sensitive elements of said light sensitive articles, each of said at least one light sources being positioned in a known relation with respect to said longitudinal axis of said telescope device;

(c) aligning said telescope device in a desired azimuth;

(d) illuminating said light sensitive articles of said underground unit via said at least one light source;

(e) calculating a deviation of said underground unit and therefore of said underground azimuth alignable device from said desired azimuth; and (f) correcting said deviation.

\* \* \* \* \*